United States Patent
St. Germain et al.

(10) Patent No.: US 11,247,918 B2
(45) Date of Patent: Feb. 15, 2022

(54) MULTI-MEDIA CLARIFICATION SYSTEMS AND METHODS

(71) Applicant: WesTech Engineering, LLC, Salt Lake City, UT (US)

(72) Inventors: Darin Lynn St. Germain, Gilbert, IA (US); Jonathan Bay Farrell, Pocatello, ID (US); Brian Lee Primrose, Nevada, IA (US); Darrell Wayne Christianson, Boone, IA (US)

(73) Assignee: WesTech Engineering, LLC, Salt Lake City, UT (US)

( * ) Notice: Subject to any disclaimer, the term of this patent is extended or adjusted under 35 U.S.C. 154(b) by 0 days.

(21) Appl. No.: 17/170,689

(22) Filed: Feb. 8, 2021

(65) Prior Publication Data
US 2021/0155506 A1    May 27, 2021

Related U.S. Application Data

(63) Continuation of application No. 15/836,628, filed on Dec. 8, 2017, now Pat. No. 10,913,667.

(51) Int. Cl.
*C02F 1/28* (2006.01)
*B01D 15/00* (2006.01)

(52) U.S. Cl.
CPC .............. *C02F 1/285* (2013.01); *B01D 15/00* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 293,745 A * | 2/1884 | Hyatt | B01D 24/4636 210/290 |
| 515,769 A | 3/1894 | Harris | |
| 620,621 A | 3/1899 | Veazie | |
| 1,195,923 A * | 8/1916 | Gans | C02F 1/281 210/276 |
| 2,308,866 A * | 1/1943 | Dekema | C02F 3/121 210/617 |
| 3,077,987 A * | 2/1963 | Morimoto | B01D 24/005 210/769 |
| 3,122,594 A | 2/1964 | Kielback | |
| 3,219,194 A | 11/1965 | Schwartzwalder | |
| 3,374,896 A * | 3/1968 | Palmer | B01D 24/4621 210/272 |
| 3,412,863 A * | 11/1968 | Stuart, Sr. | B01D 24/22 210/793 |
| 3,424,674 A * | 1/1969 | Webber | B01D 24/36 210/786 |
| 3,471,025 A * | 10/1969 | Dobson | B01D 24/008 210/282 |
| 3,680,701 A | 8/1972 | Holca | |
| 3,698,554 A | 10/1972 | Mail | |

(Continued)

OTHER PUBLICATIONS

WesTech Engineering, Inc., Trident Package Water Treatment System, product brochure, published on or before Dec. 7, 2016, pp. 1-8 (shown in attachment 1).

(Continued)

*Primary Examiner* — Robert J Popovics
(74) *Attorney, Agent, or Firm* — Austin Rapp

(57) ABSTRACT

A media clarifier may have a passageway, an inlet, an outlet above the inlet, a screen, and a media bed with both compressible and incompressible media. The screen may span the passageway. The media bed may be adjacent to the screen when the media clarifier is in an operational state. Particulate matter is removed from a water stream as it passes through the media bed.

20 Claims, 9 Drawing Sheets

(56) References Cited

U.S. PATENT DOCUMENTS

| | | | | |
|---|---|---|---|---|
| 3,721,069 A | * | 3/1973 | Walker | F01M 11/08 |
| | | | | 55/319 |
| RE27,721 E | * | 8/1973 | Klock | C02F 3/04 |
| | | | | 210/617 |
| 3,826,375 A | | 7/1974 | Fournier | |
| 3,852,193 A | * | 12/1974 | Jakubek | B01D 17/08 |
| | | | | 210/744 |
| 3,869,381 A | | 3/1975 | Graveland | |
| 3,925,202 A | | 12/1975 | Hirs | |
| 3,936,281 A | * | 2/1976 | Kurmeier | B01D 47/06 |
| | | | | 95/211 |
| 3,996,317 A | * | 12/1976 | Sarmiento | B01D 53/34 |
| | | | | 261/97 |
| 4,048,068 A | * | 9/1977 | Hirs | B01D 24/105 |
| | | | | 210/793 |
| 4,076,625 A | * | 2/1978 | Scholten | B01D 24/008 |
| | | | | 210/274 |
| 4,102,786 A | * | 7/1978 | Okada | B01D 24/007 |
| | | | | 210/793 |
| 4,115,266 A | | 9/1978 | Ohshima | |
| 4,122,011 A | | 10/1978 | Strigle, Jr. | |
| 4,125,467 A | | 11/1978 | Haddad | |
| 4,139,473 A | | 2/1979 | Alldredge | |
| 4,157,959 A | | 6/1979 | Wen | |
| 4,187,175 A | * | 2/1980 | Roberts | B01D 24/22 |
| | | | | 210/793 |
| 4,191,652 A | | 3/1980 | Whitemore | |
| 4,197,205 A | * | 4/1980 | Hirs | B01D 24/001 |
| | | | | 210/275 |
| 4,198,301 A | | 4/1980 | Iwatani | |
| 4,246,119 A | * | 1/1981 | Alldredge | B01D 24/008 |
| | | | | 210/279 |
| 4,253,947 A | | 3/1981 | Fan | |
| 4,290,785 A | * | 9/1981 | Alldredge | B01D 46/30 |
| | | | | 95/276 |
| 4,322,296 A | | 3/1982 | Fan | |
| 4,350,590 A | | 9/1982 | Robinson | |
| 4,420,403 A | | 12/1983 | Tufts | |
| 4,427,555 A | | 1/1984 | Brown | |
| 4,438,000 A | | 3/1984 | Fan | |
| 4,446,027 A | | 5/1984 | Simmers | |
| 4,487,727 A | | 12/1984 | Ballato | |
| 4,515,691 A | * | 5/1985 | Ida | B01D 39/02 |
| | | | | 210/274 |
| 4,533,367 A | * | 8/1985 | Hadzismajlovic | B01J 8/12 |
| | | | | 95/211 |
| 4,547,286 A | | 10/1985 | Hsiung | |
| 4,582,600 A | | 4/1986 | Atkinson | |
| 4,591,437 A | * | 5/1986 | Ernryd | B01D 21/0012 |
| | | | | 210/265 |
| 4,601,825 A | | 7/1986 | Eriksson | |
| 4,608,181 A | | 8/1986 | Hsiung | |
| 4,624,789 A | | 11/1986 | Fan | |
| 4,627,923 A | * | 12/1986 | Ross | B01D 24/22 |
| | | | | 210/744 |
| 4,668,405 A | * | 5/1987 | Boze | B01D 24/008 |
| | | | | 210/795 |
| 4,725,367 A | * | 2/1988 | McKim | B01D 21/0012 |
| | | | | 210/793 |
| 4,743,382 A | | 5/1988 | Williamson | |
| 4,744,889 A | * | 5/1988 | Kruyer | B01D 17/0202 |
| | | | | 209/9 |
| 4,776,962 A | | 10/1988 | Wakeman | |
| 4,793,934 A | | 12/1988 | Thompson | |
| 4,800,021 A | * | 1/1989 | Desbos | C02F 3/2806 |
| | | | | 210/605 |
| 4,810,377 A | | 3/1989 | Kato | |
| 4,814,147 A | * | 3/1989 | Flork | B01D 15/00 |
| | | | | 210/268 |
| 4,865,734 A | | 9/1989 | Schulz | |
| 4,885,083 A | | 12/1989 | Banks | |
| 4,948,402 A | * | 8/1990 | Davis | B01D 47/12 |
| | | | | 261/98 |
| 4,963,257 A | | 10/1990 | Schulz | |
| 5,009,776 A | | 4/1991 | Banks | |
| 5,030,353 A | | 7/1991 | Stuth | |
| 5,059,315 A | | 10/1991 | Senape | |
| 5,080,808 A | | 1/1992 | Kim | |
| 5,087,354 A | | 2/1992 | Montagnon | |
| 5,114,595 A | * | 5/1992 | Hensley | B01D 24/12 |
| | | | | 210/792 |
| 5,122,287 A | * | 6/1992 | Hsiung | B01D 24/007 |
| | | | | 210/792 |
| 5,126,042 A | | 6/1992 | Malone | |
| 5,145,589 A | | 9/1992 | Okubo | |
| 5,194,231 A | * | 3/1993 | Gough | F28F 13/00 |
| | | | | 422/312 |
| 5,198,124 A | | 3/1993 | Kim | |
| 5,200,081 A | | 4/1993 | Stuth | |
| 5,202,027 A | | 4/1993 | Stuth | |
| 5,217,616 A | | 6/1993 | Sanyal | |
| 5,227,051 A | | 7/1993 | Oshima | |
| 5,229,015 A | | 7/1993 | Keep | |
| 5,232,586 A | | 8/1993 | Malone | |
| 5,248,415 A | | 9/1993 | Masuda | |
| 5,292,436 A | * | 3/1994 | Mathews | B01D 24/4684 |
| | | | | 210/275 |
| 5,308,479 A | * | 5/1994 | Iwai | C02F 3/223 |
| | | | | 210/151 |
| 5,314,630 A | | 5/1994 | Kim | |
| 5,387,335 A | * | 2/1995 | Iwai | C02F 3/087 |
| | | | | 210/151 |
| 5,407,574 A | | 4/1995 | Hensley | |
| 5,413,749 A | * | 5/1995 | Geiser | C02F 3/10 |
| | | | | 264/293 |
| 5,429,740 A | | 7/1995 | Van Der Herberg | |
| 5,445,740 A | | 8/1995 | Malone | |
| RE35,234 E | * | 5/1996 | Davis | B01D 47/12 |
| | | | | 261/98 |
| 5,573,663 A | | 11/1996 | Junius | |
| 5,578,200 A | * | 11/1996 | Funakoshi | B01D 24/40 |
| | | | | 210/134 |
| 5,578,202 A | | 11/1996 | Hirane | |
| 5,616,241 A | | 4/1997 | Khudenko | |
| 5,618,431 A | | 4/1997 | Kondo | |
| 5,620,607 A | * | 4/1997 | Bowie, Jr. | B01D 24/00 |
| | | | | 210/702 |
| 5,626,763 A | * | 5/1997 | Mathews | B01D 15/00 |
| | | | | 210/290 |
| 5,723,043 A | * | 3/1998 | Hawk | C02F 3/06 |
| | | | | 210/108 |
| 5,730,872 A | * | 3/1998 | Rhodes | B01D 17/0208 |
| | | | | 210/519 |
| 5,747,311 A | | 5/1998 | Jewell | |
| 5,750,041 A | | 5/1998 | Hirane | |
| 5,766,488 A | | 6/1998 | Uban | |
| 5,770,080 A | | 6/1998 | Malone | |
| 5,800,709 A | * | 9/1998 | Smith | C02F 3/04 |
| | | | | 210/617 |
| 5,804,062 A | * | 9/1998 | Wyness | B01D 21/2405 |
| | | | | 210/86 |
| 5,866,019 A | * | 2/1999 | Wyness | B01D 21/2427 |
| | | | | 210/793 |
| 5,882,531 A | * | 3/1999 | Cohen | B01D 24/08 |
| | | | | 210/793 |
| 5,932,092 A | | 8/1999 | Hawk | |
| 5,945,005 A | | 8/1999 | Junius | |
| 5,985,148 A | * | 11/1999 | Liu | C02F 3/103 |
| | | | | 210/605 |
| 6,015,497 A | | 1/2000 | Steen | |
| 6,063,268 A | | 5/2000 | Jowett | |
| 6,100,081 A | * | 8/2000 | Buelna | C02F 3/04 |
| | | | | 435/266 |
| 6,110,389 A | | 8/2000 | Horowitz | |
| 6,171,480 B1 | | 1/2001 | Lee | |
| 6,238,556 B1 | * | 5/2001 | Hawk | B01D 24/16 |
| | | | | 210/167.13 |
| 6,326,191 B2 | * | 12/2001 | VanToever | C02F 1/006 |
| | | | | 435/299.1 |

(56) References Cited

U.S. PATENT DOCUMENTS

| | | | |
|---|---|---|---|
| 6,365,044 B1* | 4/2002 | Crane | B01D 35/30 210/248 |
| 6,391,448 B1* | 5/2002 | Geiser | C02F 3/10 428/402 |
| 6,428,690 B1 | 8/2002 | Tse | |
| 6,447,675 B1* | 9/2002 | James | C05F 7/00 210/150 |
| 6,461,525 B2* | 10/2002 | Ellard | B01D 24/002 210/797 |
| 6,517,724 B1 | 2/2003 | Malone | |
| 6,605,216 B1* | 8/2003 | Lederman | B01D 24/165 210/269 |
| 6,617,155 B1* | 9/2003 | Van Toever | B01J 19/30 435/297.1 |
| 6,638,422 B1* | 10/2003 | Schwartzkopf | B01D 24/165 210/108 |
| 6,666,436 B1* | 12/2003 | Lerner | B01D 53/18 261/95 |
| 6,666,965 B1* | 12/2003 | Timmons | A01K 63/045 210/150 |
| 6,682,653 B2 | 1/2004 | Chaung | |
| 6,685,826 B1* | 2/2004 | James | C02F 3/06 210/150 |
| 6,709,574 B2* | 3/2004 | James | C02F 3/10 210/90 |
| 6,790,347 B2 | 9/2004 | Jeong | |
| 7,029,578 B2* | 4/2006 | Spruce | C02F 1/288 210/177 |
| 7,204,930 B2* | 4/2007 | Nightingale | C02F 1/74 210/104 |
| 7,223,347 B2 | 5/2007 | Boner | |
| 7,270,745 B2 | 9/2007 | Schwartzkopf | |
| 7,270,755 B2* | 9/2007 | Schwartzkopf | B01D 24/36 210/741 |
| 7,329,350 B2* | 2/2008 | James | C02F 3/087 210/616 |
| 7,374,676 B2 | 5/2008 | Dew, Jr. | |
| 7,416,667 B2* | 8/2008 | Benachenou | B01D 17/045 210/285 |
| 7,435,351 B2 | 10/2008 | Boner | |
| 7,468,134 B2 | 12/2008 | Hoang | |
| 7,470,372 B2* | 12/2008 | Martin | B01D 24/08 210/795 |
| 7,488,413 B2 | 2/2009 | Badreddine | |
| 7,569,737 B2 | 8/2009 | Phelps | |
| 7,572,383 B2 | 8/2009 | Dew, Jr. | |
| 7,582,474 B2 | 9/2009 | Lupton | |
| 7,670,489 B2 | 3/2010 | Torrijos | |
| 7,785,479 B1* | 8/2010 | Hosford | B01D 21/0018 210/786 |
| 7,914,678 B2* | 3/2011 | Beggs | C02F 3/04 210/617 |
| 8,029,680 B2* | 10/2011 | Shinoda | B01D 29/48 210/777 |
| 8,062,712 B2* | 11/2011 | Meneghini | B01J 27/22 427/450 |
| 8,110,116 B2* | 2/2012 | Mimura | B01D 24/4631 210/792 |
| 8,323,514 B2* | 12/2012 | Geibel | B01D 24/46 210/792 |
| 8,721,895 B2* | 5/2014 | Benachenou | B01D 17/0208 210/661 |
| 8,747,532 B2* | 6/2014 | Chang | B01D 47/14 96/290 |
| 8,753,511 B2 | 6/2014 | Assulin | |
| 8,864,989 B2* | 10/2014 | Koishi | C02F 1/004 210/274 |
| 8,925,490 B2* | 1/2015 | Holder | A01K 63/045 119/260 |
| 9,149,746 B2 | 10/2015 | Choi | |
| 9,440,864 B2 | 9/2016 | Woo | |
| 9,718,004 B2 | 8/2017 | Fujita | |
| 9,802,141 B1* | 10/2017 | Zwanziger | C02F 1/004 |
| 9,827,512 B2* | 11/2017 | Malone | B01D 24/40 |
| 9,969,635 B2* | 5/2018 | Kaldate | C02F 3/2826 |
| 10,238,997 B2 | 3/2019 | Malone | |
| 10,392,277 B2* | 8/2019 | Liu | C02F 3/00 |
| 10,407,317 B2 | 9/2019 | Miyata | |
| 10,618,825 B2 | 4/2020 | Lee | |
| 10,744,429 B2 | 8/2020 | Oz | |
| 10,864,465 B2* | 12/2020 | Boyd | B01D 24/4621 |
| 10,888,806 B2* | 1/2021 | Bloomfield | B01D 21/0012 |
| 10,913,667 B2* | 2/2021 | St. Germain | C02F 1/004 |
| 11,052,363 B1* | 7/2021 | Glover | B01J 19/30 |
| 2001/0002313 A1* | 5/2001 | W.VanToever | B01J 19/30 435/299.1 |
| 2001/0045392 A1 | 11/2001 | Grey | |
| 2003/0111431 A1 | 6/2003 | Dew, Jr. | |
| 2004/0112823 A1* | 6/2004 | Benachenou | B01D 17/045 210/285 |
| 2004/0129653 A1* | 7/2004 | Spruce | C02F 1/004 210/807 |
| 2004/0140256 A1 | 7/2004 | Dew, Jr. | |
| 2004/0206710 A1* | 10/2004 | Yamada | B01D 24/16 210/792 |
| 2005/0029204 A1 | 2/2005 | Schwartzkopf | |
| 2005/0127011 A1 | 6/2005 | Schwartzkopf | |
| 2005/0211644 A1 | 9/2005 | Goldman | |
| 2006/0151366 A1* | 7/2006 | Hoang | A01K 63/045 210/95 |
| 2006/0175262 A1* | 8/2006 | Martin | B01J 47/022 210/670 |
| 2006/0231510 A1* | 10/2006 | Benachenhou | B01D 17/0202 210/799 |
| 2007/0007201 A1 | 1/2007 | Lupton | |
| 2007/0163954 A1 | 7/2007 | Badreddine | |
| 2007/0264704 A1* | 11/2007 | Van Toever | B01F 5/102 435/262 |
| 2008/0245743 A1 | 10/2008 | Dew | |
| 2008/0257804 A1 | 10/2008 | Dew | |
| 2008/0257805 A1 | 10/2008 | Dew | |
| 2009/0294356 A1* | 12/2009 | Beggs | B01D 24/4631 210/618 |
| 2010/0051526 A1 | 3/2010 | Lawrence | |
| 2012/0006744 A1* | 1/2012 | Phattaranawik | C02F 3/301 210/605 |
| 2012/0024798 A1* | 2/2012 | Pickett | C02F 1/72 210/719 |
| 2012/0067818 A1* | 3/2012 | Westrum | C02F 3/06 210/615 |
| 2012/0211430 A1 | 8/2012 | Choi | |
| 2013/0001161 A1* | 1/2013 | Boner | C02F 3/04 210/615 |
| 2013/0126412 A1* | 5/2013 | Kaldate | C02F 3/2806 210/284 |
| 2013/0220913 A1* | 8/2013 | Cohen | B01D 29/68 210/275 |
| 2014/0291224 A1 | 10/2014 | Fujita | |
| 2015/0136667 A1* | 5/2015 | Malone | C02F 3/06 210/108 |
| 2015/0190738 A1 | 7/2015 | Bosisio | |
| 2015/0343336 A1* | 12/2015 | Mackay Pett | B01J 20/08 502/22 |
| 2016/0250571 A1* | 9/2016 | Bloomfield | B01D 24/4673 210/774 |
| 2018/0133624 A1* | 5/2018 | Malone | B01D 24/28 |
| 2019/0039001 A1 | 2/2019 | Le Roux | |
| 2019/0046901 A1 | 2/2019 | Boyd | |
| 2019/0177181 A1 | 6/2019 | St. Germain | |
| 2021/0093986 A1* | 4/2021 | Boyd | B01D 24/4626 |
| 2021/0155506 A1* | 5/2021 | St. Germain | B01D 15/00 |

OTHER PUBLICATIONS

WesTech Engineering, Inc., Tri-Mite Package Water Treatment Plant, online brochure [retrieved on Jul. 18, 2018], published on or before Dec. 7, 2016, Retrieved from the Internet: <URL: http://www.westech-inc.com/en- usa/products/package-water-treatment-plant-tri-mite> pp. 1-4 (shown in attachment 2).

(56) References Cited

OTHER PUBLICATIONS

WesTech Engineering, Inc., Tricon Adsorption Clarification, online brochure [retrieved on Jul. 18, 2018], published on or before Dec. 7, 2016, Retrieved from the Internet: <URL: http://www.westech-inc.com/en-usa/ products/triconandtrade-adsorption-clarification> pp. 1-4 (shown in attachment 3).
WesTech Engineering, Inc., Adsorption Clarification, online brochure [retrieved on Jul. 18, 2018], published on or before Dec. 7, 2016, Retrieved from the Internet: <URL: http://www.westech-inc.com/en-usa/products/ adsorption-clarifier> pp. 1-4 (shown in attachment 4).
WesTech Engineering, Inc., Trident HS Package Water Treatment Plant, online brochure [retrieved on Aug. 14, 2018], published on or before Jun. 25, 2017, Retrieved from the Internet: <URL: https://web.archive.org/ web/20170625132453/http:/www.westech-inc.com/en-usa/products/package-water-treatment-plant-trident-hs> pp. 1-4 (shown in attachment 5).
WesTech Engineering, Inc., Trident HS Package Water Treatment Plant, online brochure [retrieved on Aug. 10, 2018], published on or before Aug. 10, 2017, Retrieved from the Internet: <URL: https://web.archive.org/web/20170810234338/http:/www.westech-inc.com:80/en-usa/products/package-water-treatment-plant-trident-hs> pp. 1-4 (shown in attachment 6).
WesTech Engineering, Inc., Trident HSC Package Water Treatment Plant, online brochure [retrieved on Jul. 18, 2018], published on or before Dec. 7, 2016, Retrieved from the Internet <URL: http://www.westech-inc.com/en- usa/products/package-water-treatment-plant-trident-hsc> pp. 1-3 (shown in attachment 7).
WesTech Engineering, Inc., Trident Package Water Treatment Plant, online brochure [retrieved on Jul. 18, 2018], published on or before Dec. 7, 2016, Retrieved from the Internet: <URL: http://www.westech-inc.com/en- usa/products/package-water-treatment-plant-trident> pp. 1-5 (shown in attachment 8).
WesTech Engineering, Inc., WWETCO FlexFilter High-Rate Compressible Media Filter, brochure, published on or before Dec. 7, 2016, pp. 1-2 (shown in attachment 9).
WesTech Engineering, Inc., WWETCO FlexFilter CSO and Tertiary Treatment, online brochure [retrieved on Jul. 18, 2018], published on or before Dec. 7, 2016, Retrieved from the Internet <URL: http://www.westech-inc. com/en-usa/products/combined-sewer-overflow-cso-and-tertiary-treatment-wwetco-flexfilter> pp. 1-6 (shown in attachment 10).
Roberts Filter Group, Pacer II Packaged Water Treatment Plants, online brochure [retrieved on Jul. 18, 2018], published on or before Dec. 7, 2016, Retrieved from the Internet: <URL http://www.robertsfilter.com/pacer-ii- packaged-water-treatment-plants/> pp. 1-2 (shown in attachment 11).
Tonka Water, ClariFlote, webpage [online] [retrieved on Jul. 18, 2018], published on or before Dec. 7, 2016, Retrieved from the Internet: <URL: https://www.tonkawater.com/product/clariflote/> pp. 1-3 (shown in attachment 12).
Tonka Water, ClariFlote Clarification and Filtration Two-Stage Treatment, online brochure [retrieved on Jul. 18, 2018], published on or before Dec. 7, 2016, Retrieved from the Internet: <URL: https://www.tonkawater.com/wp-content/uploads/2017/12/TonkaWater_ClariFlote_Brochure.pdf> pp. 1-2 (shown in attachment 13).
Tonka Water, ClariFlote, catalog drawings [online] [retrieved on Jul. 18, 2018], published on or before Dec. 7, 2016, Retrieved from the Internet: <URL: https://www.tonkawater.com/wp-content/uploads/2018/06/ TonkaWater_ClariFlote_Drawing.pdf> pp. 1-3 (shown in attachment 14).
Schreiber, Compressible Media Filtration, webpage [online] [retrieved on Jul. 18, 2018], published on or before Dec. 7, 2016, Retrieved from the Internet: <URL: http://www.schreiberwater.com/product/fuzzy-filter/> pp. 1-6 (shown in attachment 15).
Schreiber, Fuzzy Filter, online brochure [retrieved on Jul. 18, 2018], published on or before Dec. 7, 2016, Retrieved from the Internet: <URL: http://www.schreiberwater.com/wp-content/uploads/201Z/06/Fuzzy_Filter-web.pdf> pp. 1-2 (shown in attachment 16).
Infilco Degremont, Inc., Civil Engineering Reference, webpage [online] [retrieved on Jul. 18, 2018], published on or before Dec. 7, 2016, Retrieved from the Internet: <URL: http://what-when-how.com/Tutorial/topic-84560te3/ Public-Water-Systems-898.html> pp. 1-2 (shown in attachment 17).
WesTech Engineering, Inc., Mixed Media Adsorption Clarifier System Increases Plant Net Production, flyer, publicly disclosed on or before Oct. 26, 2017 pp. 1-2 (shown in attachment 18).
Restriction Requirement, U.S. Appl. No. 15/836,628, dated Jan. 16, 2020, pp. 1-9 (shown in attachment 19).
Restriction Requirement Response, U.S. Appl. No. 15/836,628, filed Feb. 26, 2020, pp. 1-9 (shown in attachment 20).
Examiner-Initiated Interview Summary, U.S. Appl. No. 15/836,628, dated Jun. 1, 2020, p. 1 (shown in attachment 21).
Office Action, U.S. Appl. No. 15/836,628, dated Jun. 1, 2020, pp. 1-11 (shown in attachment 22).
Office Action Response, U.S. Appl. No. 15/836,628, filed Sep. 1, 2020, pp. 1-14 (shown in attachment 23).
Notice of Allowance and Fee(s) Due (including a Notice of Allowability section), U.S. Appl. No. 15/836,628, dated Oct. 5, 2020, pp. 1-5 (shown in attachment 24).

* cited by examiner

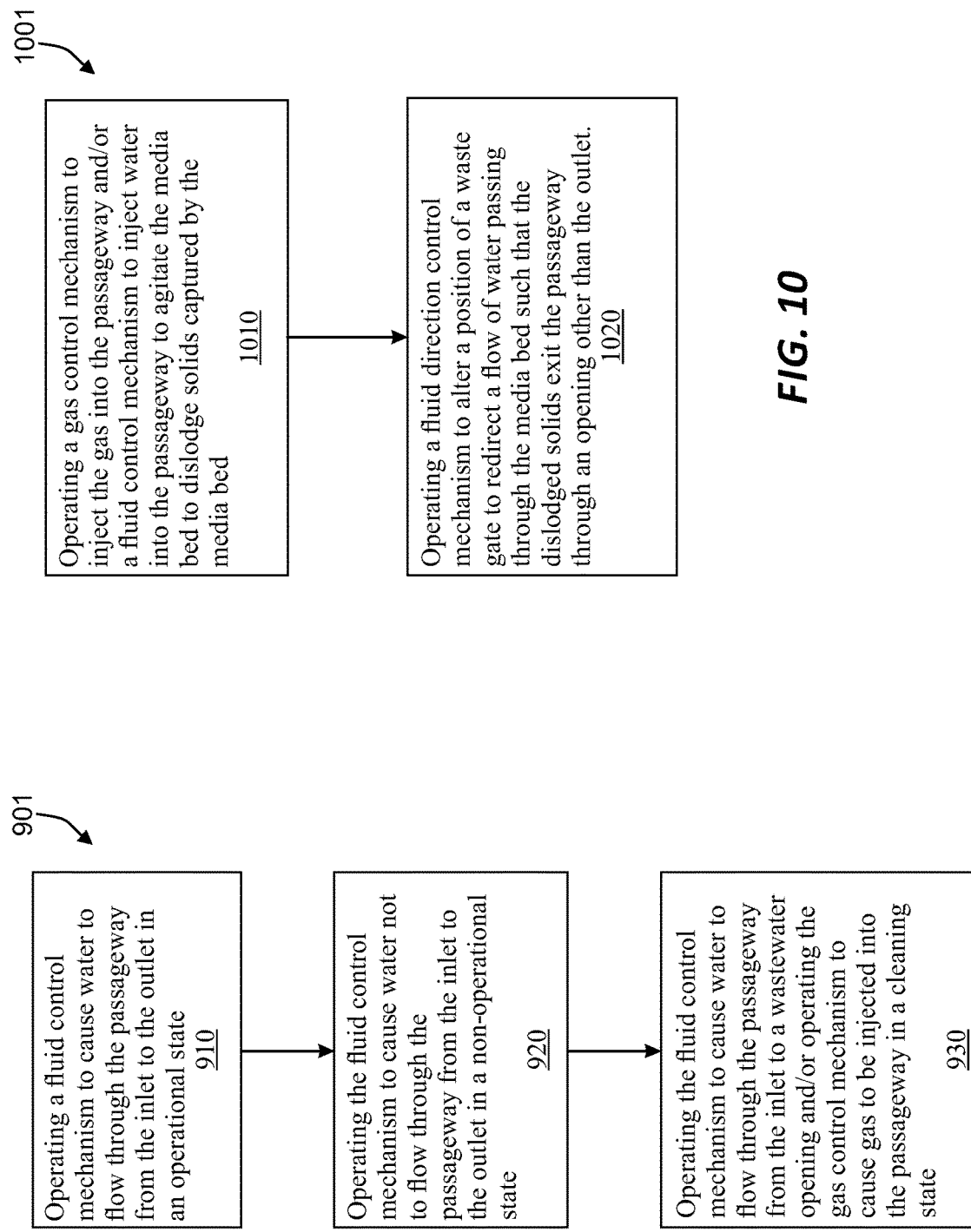

MULTI-MEDIA CLARIFICATION SYSTEMS AND METHODS

RELATED APPLICATIONS

This application claims priority to and is a continuation application of U.S. application Ser. No. 15/836,628, which was filed on 8 Dec. 2017 and is entitled "MULTI-MEDIA CLARIFICATION SYSTEMS AND METHODS," which is hereby expressly incorporated by reference in its entirety.

TECHNICAL FIELD

The present invention relates to an apparatus and method for filtering fluids. More specifically, it relates to media clarifiers.

BACKGROUND

Media clarifiers use media to capture particulate matter from a water or wastewater stream. Media, which adsorbs particulate matter, helps remove solids at a faster rate than traditional clarifiers, which do not use media. Consequently, media clarifiers can handle larger flows and consume less space than a traditional clarifier. Accordingly, increasing the performance of the media employed in a media clarifier is desirable.

SUMMARY

Embodiments of the disclosed subject matter are provided below for illustrative purposes and are in no way limiting of the claimed subject matter.

A media clarifier may comprise a vessel defining a passageway for water. The vessel may comprise an inlet for the passageway, an outlet for the passageway, and a screen intermediate the inlet and the outlet that is disposed within and spans the passageway. The vessel may place the inlet in fluid communication with the screen and the outlet. When the media clarifier is in an installed configuration, the outlet may be situated above the inlet. The media bed may be disposed within the passageway intermediate the inlet and the screen. The media bed may comprise both compressible media and incompressible media.

Those skilled in the art will further appreciate that in other embodiments, the present invention is adapted for use with a variety of fluid and filtering applications.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 9 is a flow diagram illustrating one embodiment of a method for utilizing a media clarifier.

FIG. 10 is a flow diagram illustrating one embodiment of a method for cleaning a media clarifier.

Figure 1:
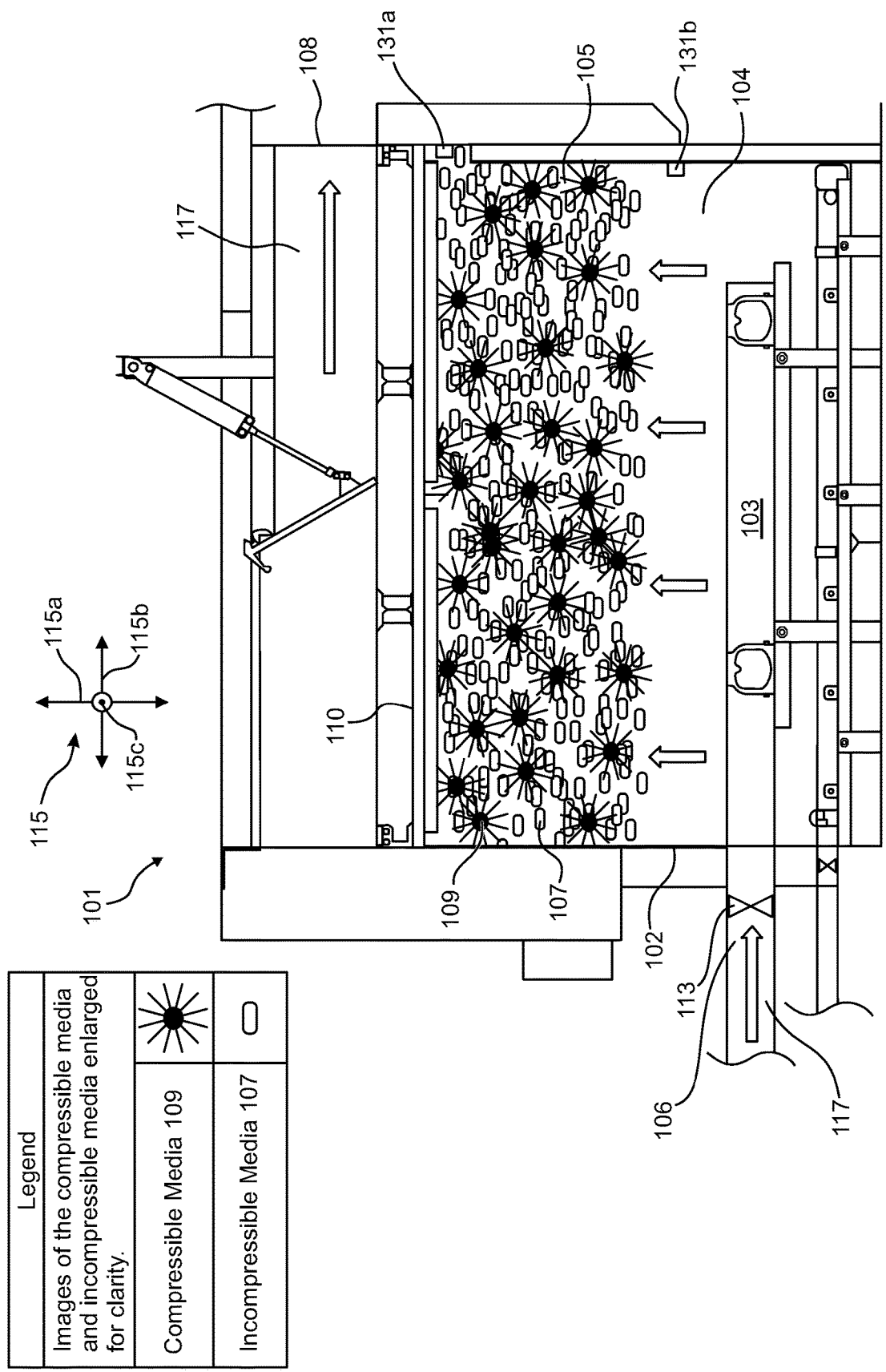
FIG. 1 is a side elevation, cross-sectional view of one embodiment of a media clarifier during normal operation.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways, even if that combination is not shown or disclosed in the same figure or portion of the disclosure. Further, the disclosed apparatuses and methods may be practiced using structures or functionality in addition to disclosed subject matter based on information known to one of skill in the art.

The term "an embodiment," "an alternative embodiment" or "one embodiment" may refer to various configurations or embodiments of the disclosed apparatuses, systems, or methods in the singular or plural form, rather than referring to a single, particular embodiment.

In the figures, certain components may appear many times within a particular drawing. However, only certain instances of the component may be identified in the figures to avoid an unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figure(s).

Media clarifiers may also be referred to as media clarification systems, filter systems, media filters, upward filters, or any combination of these terms. Media clarifiers may, in various embodiments, rely in whole or in part on principles of adsorption. Particulate matter can be filtered from a water stream as it passes through a treatment column containing adsorbent media. Media may be comprised of many members, such as beads, sand, or synthetic fibers; the word "media" refers to both a singular and plural number of these members. The system may be used in various water applications, such as drinking water or wastewater treatment. The water stream provided to the system may be pressurized, using, for example, a pump or gravity. Particulate matter may include dirt, sand, minerals, biological material, and/or other types of material, and may also include flocculated particles comprising chemicals such as flocculants and/or coagulants.

One type of media used in a media filter is incompressible. Incompressible media does not flex or deform under pressures typically encountered in water filtration systems (e.g., pressures generated in 5 to 150 inches of water). In various embodiments of the invention, incompressible media comprises small beads, which may be as small as 1 millimeter. The beads may be made of high-density polyethylene (HDPE) or other natural or synthetic materials. Other examples of incompressible media include other plastics, such as Acrylonitrile Butadiene Styrene (ABS), low-density polyethylene (LDPE), or natural materials, such as charcoal or wood. Incompressible media may adsorb particulate matter on the media surface and within interstitial space between adjacent media beads. The surface of incompressible media may comprise a disturbed surface, such as by scarification, sanding, or other roughening applications, which makes the incompressible media more adsorbent.

Media may also be compressible. One example of compressible media utilizes bundles of elongated plastic fibers. The bundles of elongated plastic fibers may be tightly bound with a clip, ring, staple, crimp, or clamp at the center and fan out at the ends. These bundles, when bound, may be spherical in shape. In various embodiments, the fibers may be made from a combination of polypropylene and polyethylene terephthalate and may be approximately three (3) inches in length. In such embodiments, when the fibers are crimped or clamped together, each fibrous ball may have a diameter of approximately 1.5 to 2 inches. In various embodiments of the invention, compressible media may flex or change size or shape under pressure. Thus, the compressible media may be more flexible than the incompressible media measured, for example, using the flexural modulus, which indicates a tendency to bend rather than break. Compressible media may capture particulate matter by any combination of adsorption on its surface or in its fibers, capture within the interstitial spaces between media, or capture by the compression and/or flexion of the media's shape.

The media bed may be comprised, in various embodiments, of sufficient media to span the cross-sectional area of the water column along a horizontal dimension The media bed may also be thick enough to allow the water to flow over enough media surface area to capture a sufficient quantity of particulate matter to make the filter useful, which in various embodiments, may be at least six (6) inches in depth. If more than one type of media is used in the media bed, each type of media may be sufficient in number to span the cross-sectional area of the water column along a horizontal dimension of a certain depth (e.g., at least three (3) inches deep) without the other type of media. Alternatively, a combination of the types of media may be of a certain depth.

Media, whether compressible or incompressible, in various embodiments, may have a specific gravity of less than 1. However, various factors such as the specific gravity of the fluid, the quantity and mass of solids in the fluid, and the speed of the fluid may allow use of media that has a specific gravity of 1 or greater to rise to the filter bed.

Compressible media can typically hold more particulate matter than incompressible media but generally cannot capture finer particles while it is uncompressed. For this reason, some compressible media filters employ a system to compress the media. However, while the media is compressed, it cannot adsorb as much particulate matter as it can in an uncompressed state. The disclosed subject matter combines the two types of media, resulting in an unexpected synergistic effect. Compressible media may be used to capture larger particles, while incompressible media captures smaller particles. The combination of the two types of media causes the system to capture more particles. It also removes a higher percentage of particulate matter than either type of media can by itself. Additionally, it allows the filter to operate without a compression system.

In various embodiments, the size of the compressible media may be much larger than the incompressible media (e.g., five (5) to twenty (20) times larger). In various alternative embodiments, compressible and incompressible media may be more similar in size (i.e., compressible media may be less than five (5) times larger). Referring to FIG. 1, one embodiment of a media clarifier 101 is illustrated. In the illustrated embodiment, the media clarifier 101 may comprise a vessel 102 defining a passageway 104 for water 117 with an inlet 106, and an outlet 108. The outlet 108 may also be referred to as the effluent outlet 108. The media clarifier 101 may further comprise a screen 110 intermediate the inlet 106 and the outlet 108. The screen 110 may span the passageway 104. The outlet 108 may be a collection trough, pipe, or other mechanism for receiving effluent water 117. The vessel 102 may place the inlet 106 in fluid communication with the screen 110 and the outlet 108. In the installed configuration, as illustrated in FIG. 1, the outlet 108 may be situated above the inlet 106.

In the installed configuration, the media clarifier 101 may include a vertical dimension 115a, a horizontal dimension 115b, and a transverse dimension 115c, as illustrated on the dimensional guide 115. In this application, the term "above" indicates a higher elevation along a vertical dimension 115a. In contrast, the term "directly above" signifies that a first element is located at a higher elevation along a vertical dimension 115a relative to a second element with the first element and the second element at least overlapping along a horizontal dimension 115b. As a result, in various embodiments, the outlet 108 may or may not be directly above the inlet 106, but the outlet 108 may simply be above (i.e., at a higher elevation along a vertical dimension 115a). Influent water 117 enters the media clarifier 101 through an inlet 106, which may be controlled by a fluid control mechanism 113 (e.g., a pump or valve). The water 117 may then pass through a distribution header 103 (sometimes referred to as a water distribution header 103) and enter into the passageway 104, which may, in various embodiments, also be referred to or comprise a treatment column. Water 117 flows upward through the media bed 105, which may comprise both compressible media 109 and incompressible media 107. In various embodiments, the media bed 105 may comprise and/or be referred to as a filter bed 105. Solids, such as particulate matter, in the influent stream of water 117 may be separated from the stream of water 117 by adsorption on to the media surfaces, by capture using the filamentous fibers or other compressible bodies, and by capture within the interstitial spaces between the media 107, 109. The media bed 105 may be retained within the system by the screen 110, which may be described as a hold-down screen system 110 or a retention screen 110. Clarified water 117 passes through the retention screen 110 and exits via the outlet 108 (which may be located above the hold-down screen system 110) and then flows out of the media clarifier 101.

One or more of the types of media in the media bed 105 may, in certain embodiments, be buoyant. In various alternative embodiments, one or more of the types of media in the media bed 105 may be non-buoyant (such that non-buoyant media resides at the bottom of the vessel 102 when the media clarifier 101 is not in use), but may be propelled upward in response to the flow of water 117 through the vessel 102.

In various embodiments of the invention, as solids are captured, a differential pressure develops across the media bed 105. As the differential pressure increases, the compressible media 109 is compressed, which in turn tightens the interstitial spaces to retain the particulate matter. As the developing differential pressure nears the maximum allowable pressure (e.g., a predetermined differential pressure), the media clarifier 101 may be transitioned to a cleaning cycle to remove the captured particulate matter. In various embodiments, the differential pressure is regulated by constricting or expanding the volume of the media bed 105. This can be done with a mechanical wall, a flexible housing controlled by hydrostatic pressure, or other mechanisms that can alter the volume of the media bed 105 (not illustrated in FIG. 1). In certain embodiments, the predetermined differential pressure may be ascertained using a first and second pressure sensor 131a-b. The first pressure sensor 131a may be disposed within the passageway 104 downstream of or within the media bed 105, while a second pressure sensor 131b may be disposed within the passageway 104 upstream of or within the media bed 105, as illustrated in FIG. 1. In various alternative embodiments, only the pressure sensor 131b upstream relative to the media bed 105 is used in the media clarifier 101 based on the assumption that the pressure downstream of the media bed 105 will remain constant or at least relatively constant.

In various embodiments of the invention, a bottom screen positioned intermediate the inlet and the retention screen (not illustrated in FIG. 1) serves as a lower boundary for the media bed.

Figure 2:
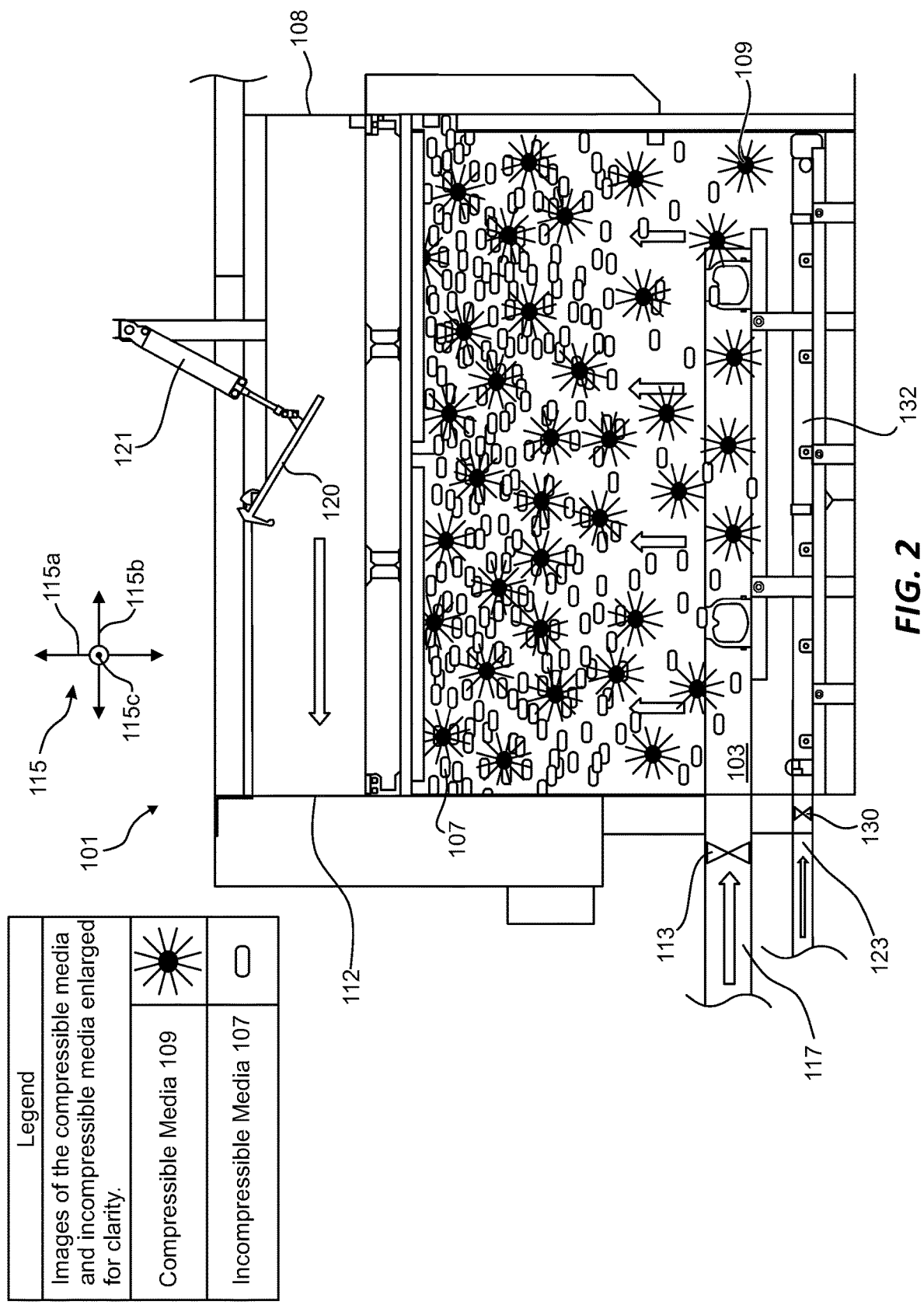
FIG. 2 is a side elevation, cross-sectional view of one embodiment of a media clarifier during a cleaning cycle.

Referring to FIG. 2, one embodiment of the present invention is illustrated in a cleaning cycle. In the installed configuration (as shown in FIG. 2), the media clarifier 101 may include a vertical dimension 115a, a horizontal dimension 115b, and a transverse dimension 115c, as illustrated on the dimensional guide 115. In the illustrated embodiment, the media clarifier 101 may be transitioned to a cleaning cycle using, in part, a flow direction control mechanism 121 (e.g., an actuating cylinder 121), which may, in various embodiments, raise a waste gate to allow the waste stream to exit the treatment vessel 102 through a wastewater opening 112 (an opening other than the outlet 108). In various embodiments, a lower edge or lip of the wastewater opening 112 is lower (along a vertical dimension 115a) than the lower edge or lip of the outlet 108. Accordingly, activating a fluid direction control mechanism 121 may simply allow water 117 passing through the media bed 105 to exit through the wastewater opening 112 before it reaches the lower lip or edge of the outlet 108. Those skilled in the art will appreciate that various types of flow direction control mechanisms 121 may be employed. In various alternative embodiments, for example, the flow direction control mechanism 121 may comprise a pair of independently controlled gates or valves.

In addition, in the cleaning cycle, a gas 123 (e.g., air) may be introduced by operating a gas control mechanism 130 (e.g., by opening a valve or activating a pump). The introduced gas 123 may flow through a distribution header 132 (sometimes referred to as a gas distribution header 132). In various embodiments, the gas control mechanism 130 and distribution header 132 may be referred to collectively as a gas or air injection mechanism assembly. In various embodiments, the bulk density of the combined gas 123 and water 117 is less than the bulk density of the compressible media 109 and/or the incompressible media 107 (because of the introduction of the gas 123) causing all or a portion of the media bed 105 to sink (not illustrated in FIG. 2). This action expands the media bed 105 to allow release of the captured particulate matter. The introduced gas 123 also causes collisions between the media 107, 109 to dislodge particulate matter that has adhered to the media surface. In various embodiments, the introduction of the gas 123 into the water 117, which causes the media bed 105 to sink and assist with the release of captured particulate matter, may be referred to as fluidization. The water 117 may thus pass through the fluid control mechanism 113 and distribution header 103 and travel in an upward direction through the media bed 105 to carry the released particulate matter away from the media clarifier 101. After a period of time, if the gas control mechanism 130 comprises a valve, the gas control mechanism 130 may be closed, or, if the gas control mechanism 130 comprises a pump, the pump may be deactivated. Water 117 may continue to pass through the vessel 102 to remove the remaining particulate matter and to assist in restoring the media bed 105 to earlier levels. The actuating cylinder 121 may be activated to close the waste gate 120 to terminate the cleaning cycle.

Figure 3:
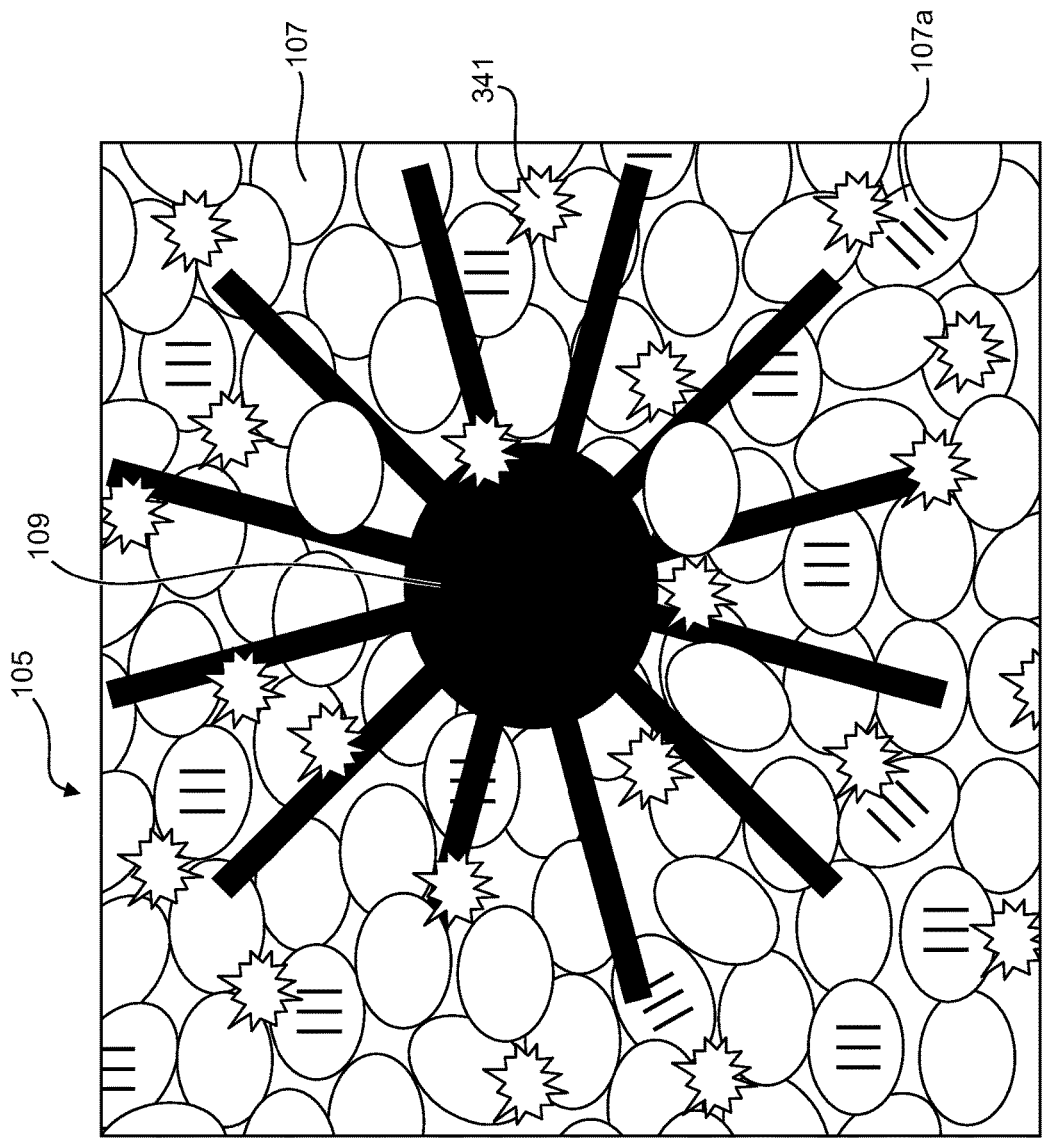
FIG. 3 is an enlarged view of one embodiment of a media bed.

FIG. 3 comprises an enlarged view of one embodiment of a media bed 105. In the illustrated embodiment, incompressible media 107 is mixed with compressible media 109 to create additional interstitial gaps with which to capture solids 341 (which comprise one type of particulate matter). In various embodiments, a portion of the incompressible media 107 has a scarified surface to aid with adsorption. The incompressible media 107 that has a scarified surface may be referred to as scarified incompressible media 107a.

Figure 4:
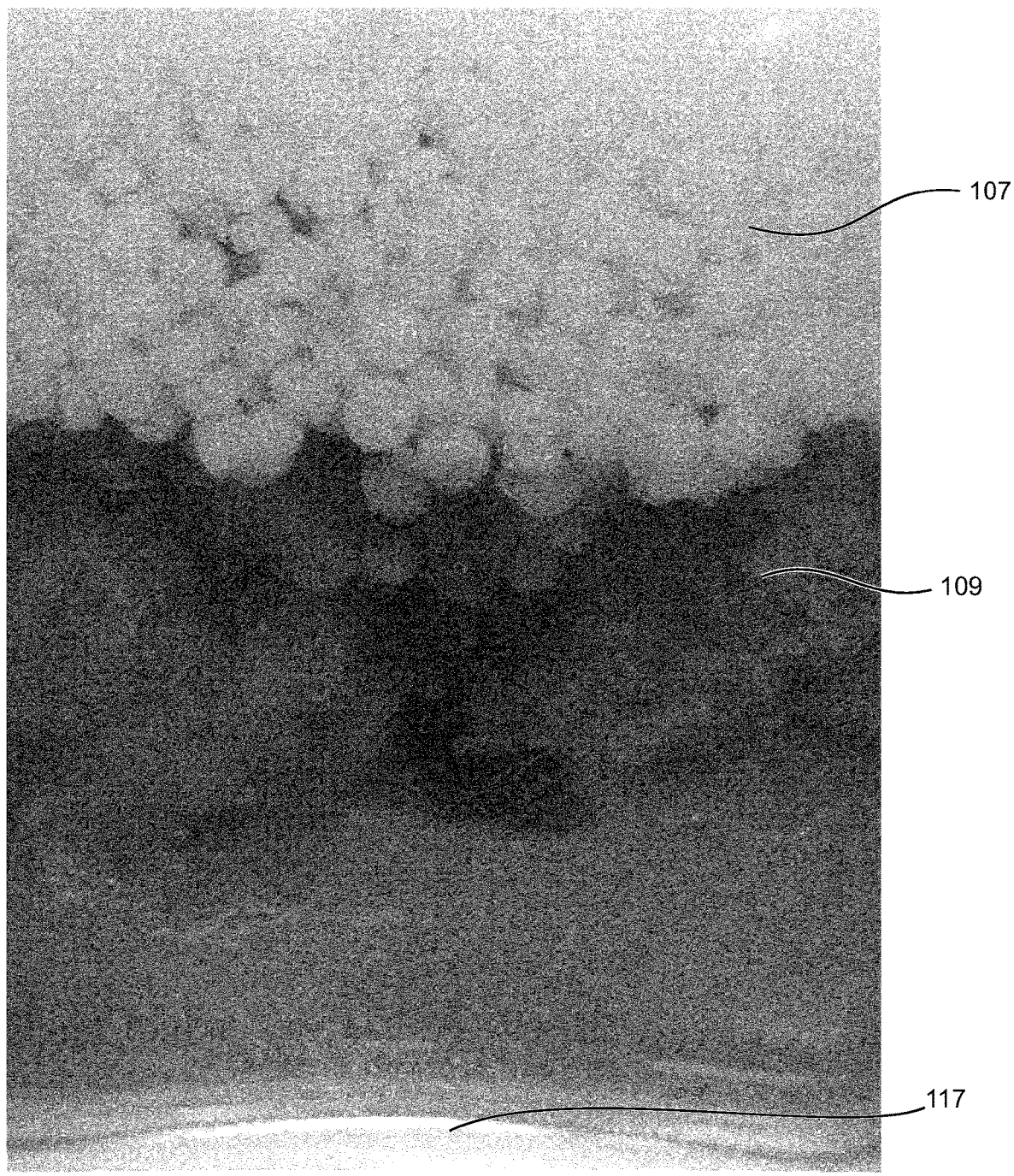
FIG. 4 is a photograph of a mixture of incompressible media interacting with compressible media.

FIG. 4 is a close-up photograph of compressible media 109 and incompressible media 107 disposed in water 117.

Figure 5:
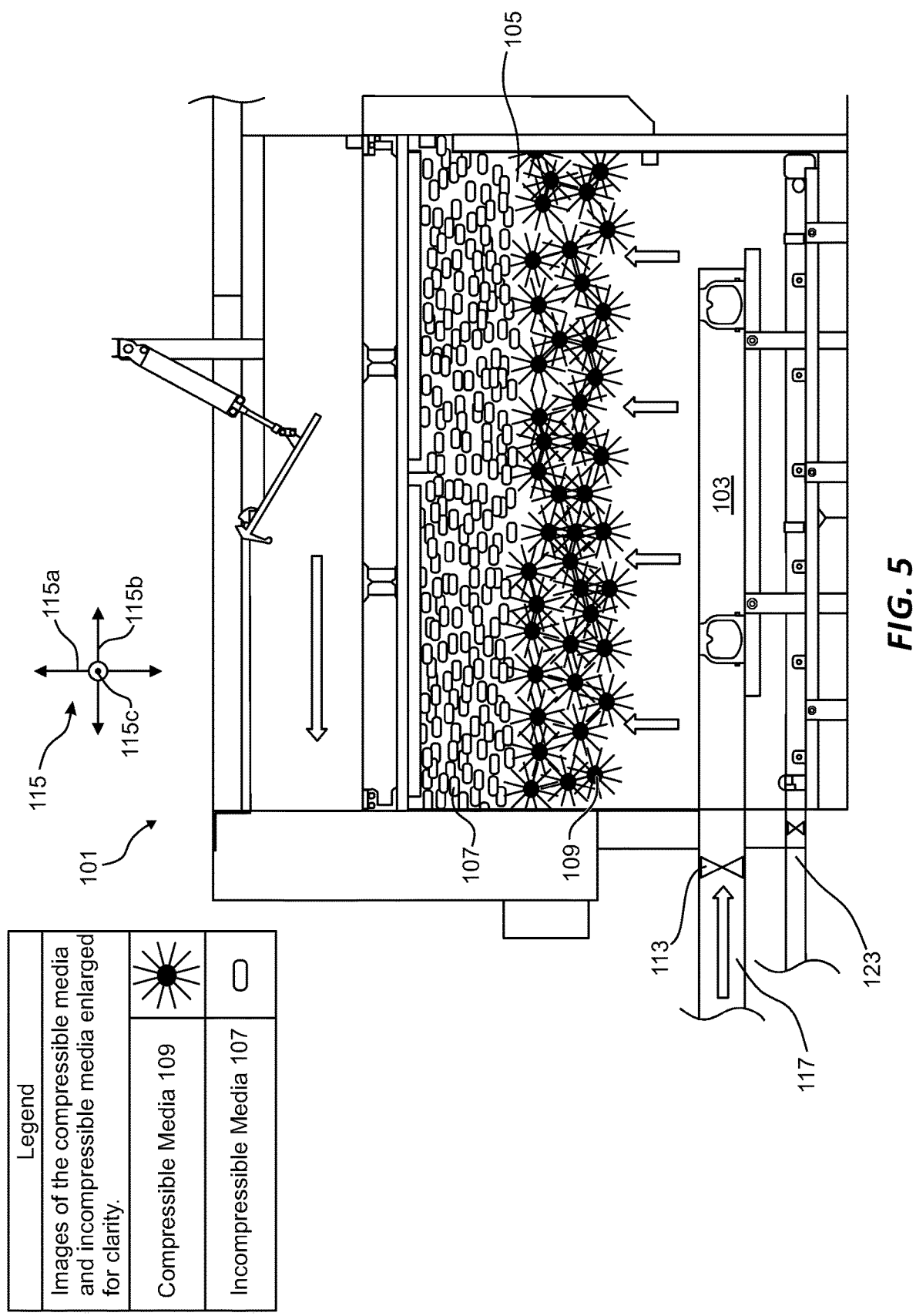
FIG. 5 is a side elevation, cross-sectional view of one embodiment of a media clarifier with media in a stratified state.

FIG. 5 illustrates one embodiment of media 107, 109 in a stratified state within a media clarifier 101. In the installed configuration (as shown in FIG. 5), the media clarifier 101 may include a vertical dimension 115a, a horizontal dimension 115b, and a transverse dimension 115c, as illustrated on the dimensional guide 115. During a cleaning cycle and prior to returning the media clarifier 101 to an operational state, as illustrated in FIG. 5, a layer of incompressible media 107 may remain on top of a layer of compressible media 109. It should be noted that the media clarifier 101 may have: an operational state, in which water 117 flows through the vessel 102 and the clarifier is operated to remove particulate matter from the influent stream of water 117; a non-operational state, in which no or little water 117 flows through the media clarifier 101; and a cleaning state, in which the media clarifier 101 is operated to dislodge particulate matter from the media 107, 109 and flush the dislodged particulate matter from the media clarifier 101.

In various embodiments, a layer of compressible media 109 may remain above a layer of incompressible media 107 (i.e., the media bed 105 is in a stratified state). This can be done by manipulating the media with streams of gas 123 and/or water 117. As illustrated in FIG. 5, the incompressible media 107 and compressible media 109 (which, in certain embodiments, may also be referred to as fibrous balls 109)

may be stratified into discrete regions. For example, before a final flush-to-waste step (which comprises a part of the cleaning cycle), the incompressible media 107 and compressible media 109 may be stratified by adjusting the gas 123 and water 117 to segregate and stack one type of media on top of the other. One example of such an adjustment is increasing the water rate and altering the gas flow rate according to the sequence identified in Table 1, which is provided below:

TABLE 1

| Stratification Steps | Gas (e.g., Air) scfm/ft² | Water gpm/ft² | Time seconds |
|---|---|---|---|
| 1 | 0 | 0 | 60 |
| 2 | <1 | 5 | 60 |
| 3 | 0 | 12.5 | 60 |
| 4 | 3 | 12.5 | 60 |

One skilled in the art will understand that the foregoing constitutes only one embodiment of a method for achieving media in a stratified state. Other approaches including varying the gas flow rate, the water flow rate, or the amount of time may be utilized to stratify the media.

Figure 6:
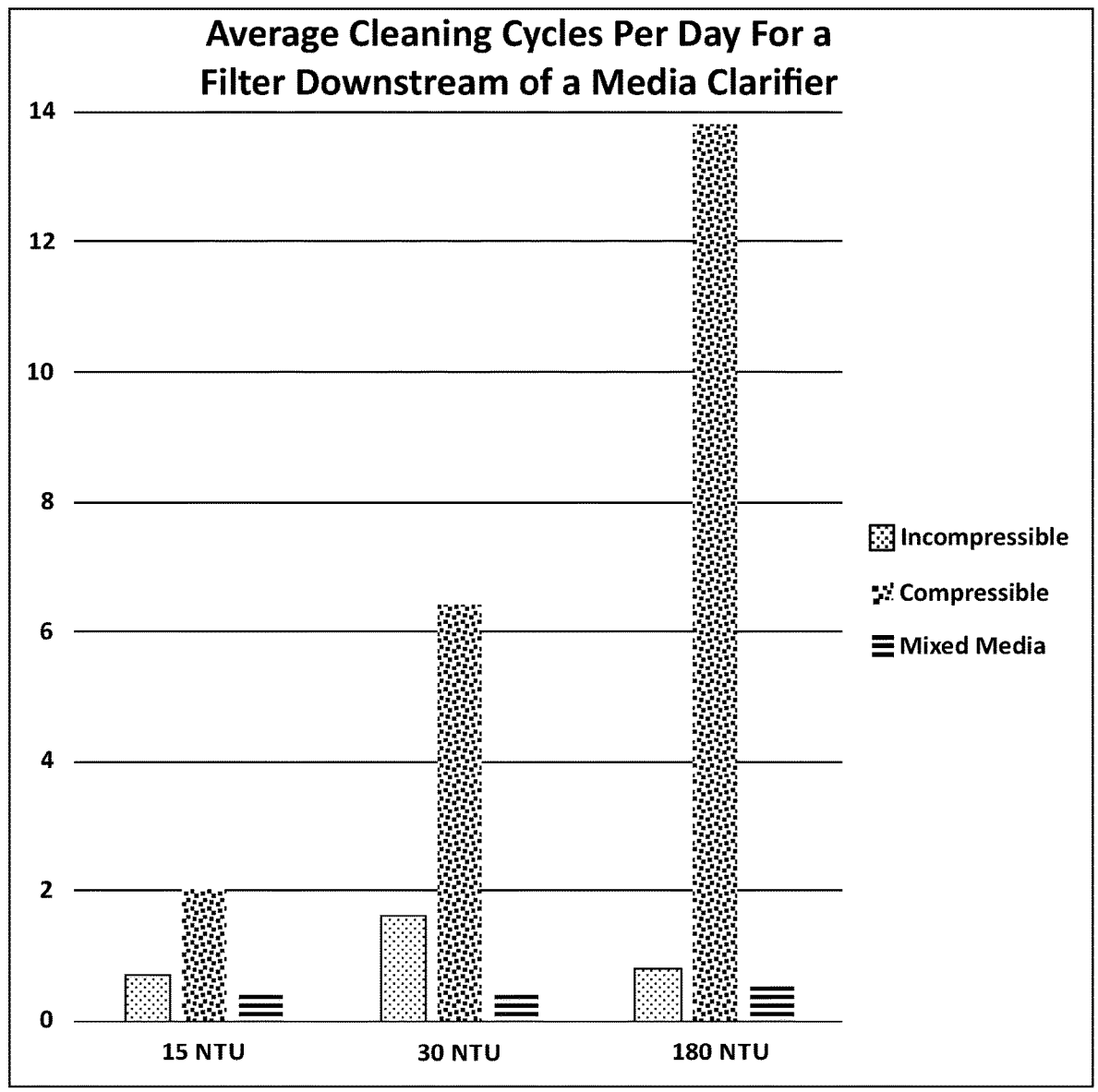
FIG. 6 is a bar graph showing that fewer cleaning cycles are needed for a filter downstream of a media clarifier when both compressible and incompressible media are used rather than a single type of media in the media clarifier.

FIG. 6 is a bar graph illustrating the average number of cleaning cycles per day for a filter (a "downstream filter") situated downstream of a media clarifier. The decreased number of cleaning cycles for the downstream filter indicates that a media clarifier with incompressible and compressible media 107, 109 provides improved removal of particulate matter. Because the media clarifier is capturing more particulate matter, additional cleaning cycles are or may be required for the media clarifier. The vertical axis of FIG. 6 identifies the average number of cleaning cycles per day for the downstream filter, while the horizontal axis identifies the quantity of particulate matter within the stream of water 117 received by the media clarifier, measured in NTU (Nephelometric Turbidity Units). A higher NTU value indicates a higher quantity of particulate matter within the incoming stream. FIG. 6 shows that a downstream filter following a media clarifier with both types of media will have fewer cleaning cycles per day compared to a downstream filter following a media clarifier with only one type of media.

Figure 7:
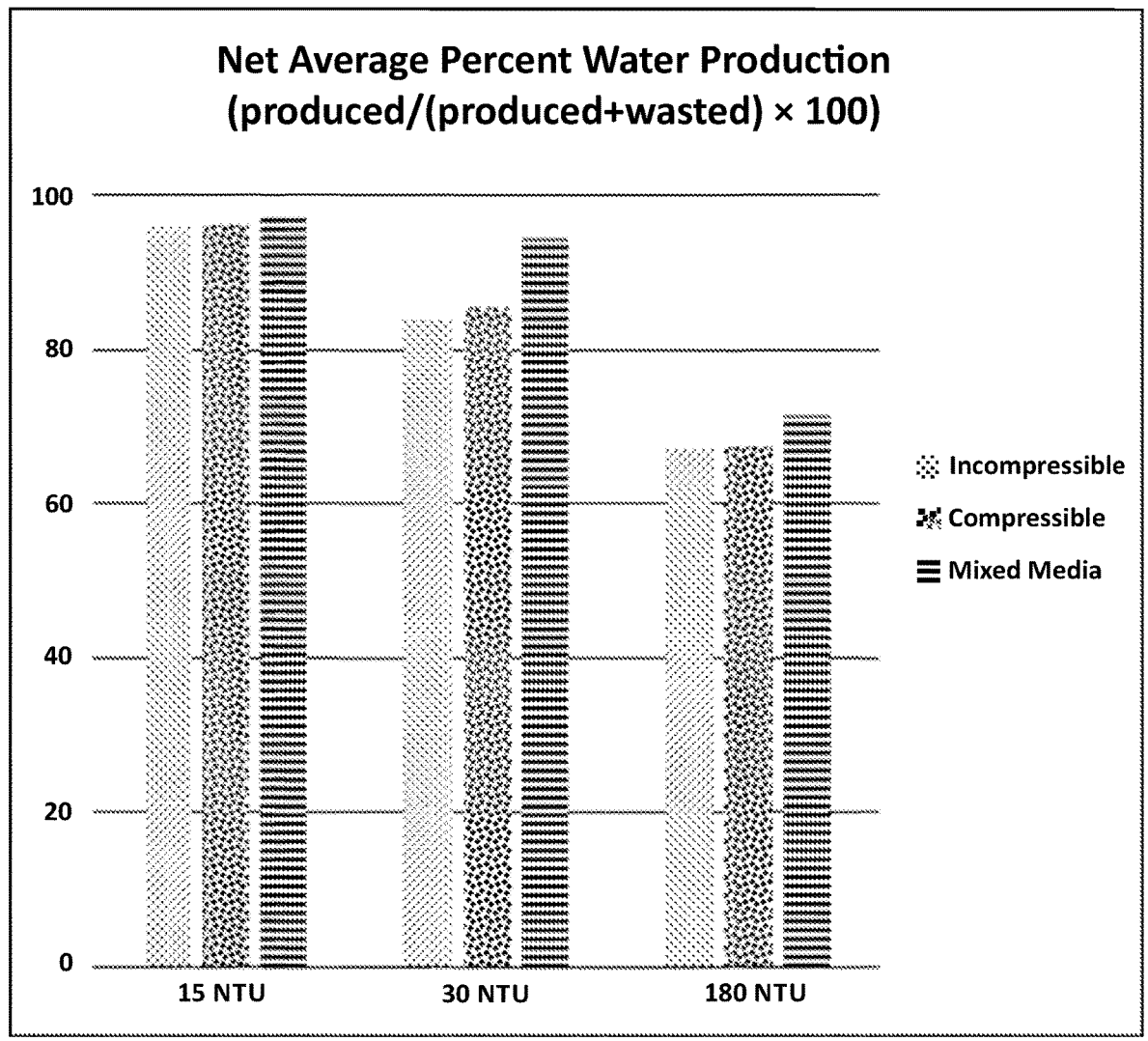
FIG. 7 is a bar graph showing that less water, on average, is wasted when both compressible and incompressible media are used rather than a single type of media.

FIG. 7 is a bar graph illustrating net average percent water production. The vertical axis of FIG. 7 identifies the net average percent of water produced, which may be defined in accordance with Equation 1.

$$[\text{Net Average Percent Water Production}] = \frac{[\text{Average Total Water Produced}]}{[\text{Average Total Water Produced}] + [\text{Average Total Water Wasted}]} \times 100 \qquad \text{Equation 1}$$

A higher number indicates that less water 117 is wasted. The horizontal axis identifies the quantity of particulate matter within the incoming stream of water 117, measured in NTU. FIG. 7 shows that a media clarifier with both types of media wastes less water 117 than a media clarifier with only one type of media.

Figure 8:
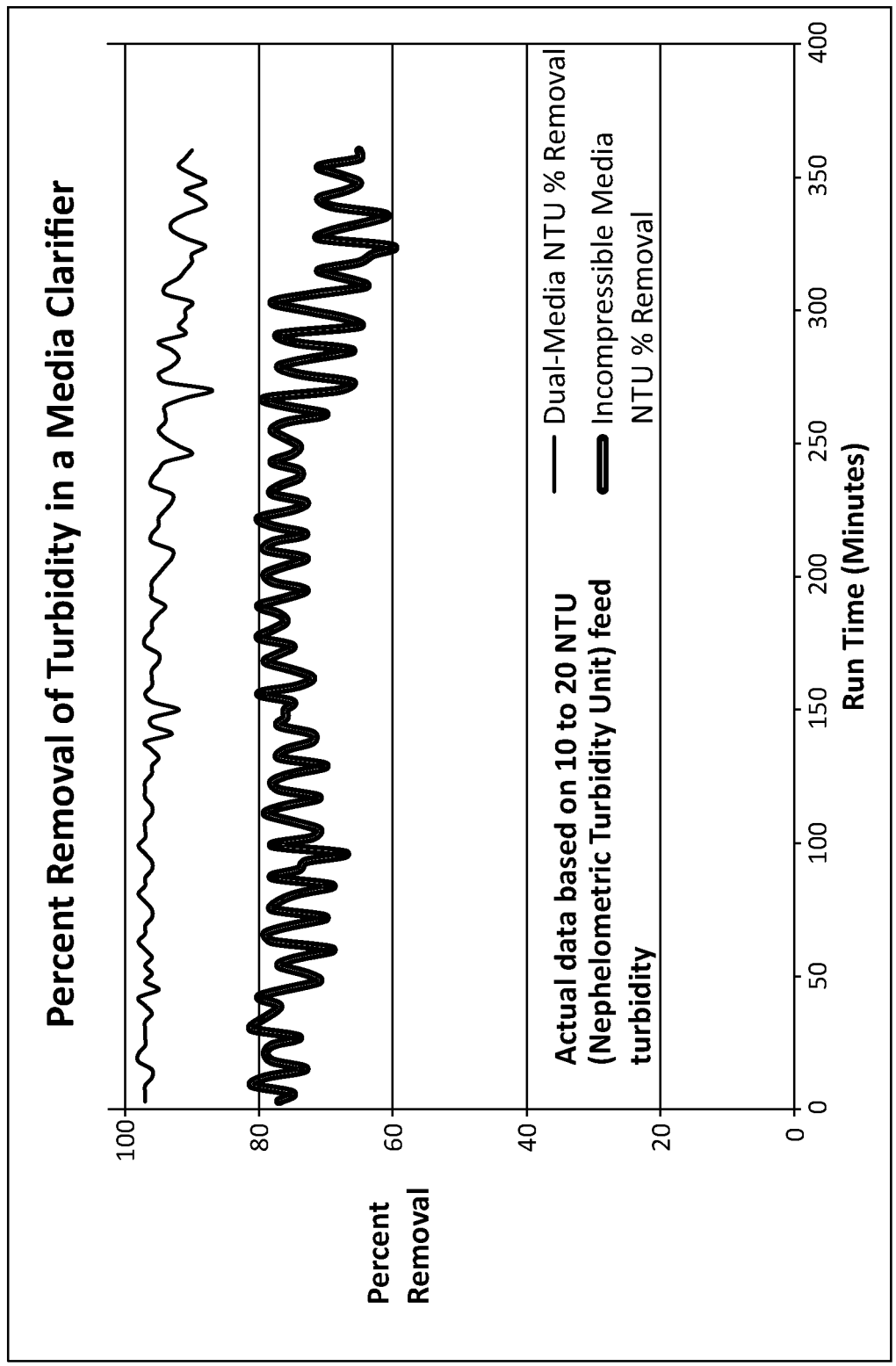
FIG. 8 is a line chart showing increased efficiency when both compressible and incompressible media are used rather than a single type of media based on two sample runs.

FIG. 8 is a line graph illustrating the percentage of particulate matter removed by two sample runs. The vertical axis of FIG. 8 identifies the percentage of particulate matter removed, measured in NTU, while the horizontal axis represents runtime in minutes. The line graph of FIG. 8 indicates that a media clarifier with both types of media removes a higher percentage of NTU than a media clarifier using only incompressible media.

FIG. 9 is a flowchart illustrating one embodiment of a method 901 for utilizing a media clarifier. Step 910 involves operating a fluid control mechanism 113 to cause water 117 to flow through the passageway 104 from the inlet 106 to the outlet 108 in an operational state. As utilized herein, the water 117 may include particulate matter at least during a portion of the time in which the water 117 is moving through the passageway 104. The fluid control mechanism 113 may comprise one or more of various types of valves or pumps. Accordingly, in various embodiments, a valve may control the flow of water 117 into the passageway 104 with the water 117 being propelled, for example, by the force of gravity or by a pump. Thus, in various embodiments, opening a valve may cause water 117 to flow through the passageway 104, while closing the valve may terminate the flow of water 117 through the passageway 104. If a pump is utilized as a fluid control mechanism 113, activating the pump will cause water 117 to flow through the passageway 104, while deactivating the pump will result in water 117 not flowing through the passageway 104.

In step 920, in a non-operational state, the fluid control mechanism 113 is operated to cause water 117 not to flow through the passageway 104 from the inlet 106 to the outlet 108. In various embodiments, step 920 may involve closing a valve and/or deactivating a pump.

In step 930, in a cleaning state, the fluid control mechanism 113 may be operated to cause water 117 to flow through the passageway 104 from the inlet 106 to a wastewater opening 112 and/or operating a gas control mechanism 130 to cause gas 123 to be injected into the passageway 104. The cleaning state of step 930 may encompass a series of stages, as discussed in connection with Table 1, or a single stage. Step 930 may also comprise inducing the media bed 105 to transition into a fluidized state and/or stratified state, as discussed above. Additional detail regarding the cleaning state will be provided in connection with FIG. 10. It should be noted that steps 910, 920, 930 may be performed in any order, not necessarily in the order illustrated in FIG. 9.

FIG. 10 is a flowchart illustrating one embodiment of a method 1001 for cleaning a media clarifier. In step 1010, a gas control mechanism 130 is operated to inject gas 123 into a passageway 104 and/or a fluid control mechanism 113 is operated to inject water 117 into the passageway 104 to agitate the media bed 105 to dislodge solids captured by the media bed 105. As noted above, this step 1010 may involve a single or a plurality of stages (see, e.g., Table 1) and may involve transitioning the media bed 105 into a fluidized and/or a stratified state.

In step 1020, a fluid direction control mechanism 121 may be operated to redirect a flow of water 117 passing through the media bed 105, such that dislodged solids exit the passageway 104 through one or more openings (e.g., a wastewater opening 112) other than the outlet 108. As noted above, various types of fluid direction control mechanisms 121 may be employed, such as an actuating arm coupled to a waste gate, and/or a plurality of valves or gates. As noted above, in various embodiments, the lower edge or lip of the wastewater opening 112 may be lower than a lower edge or lip of the outlet 108. Accordingly, in such embodiments, merely allowing the water 117 to access the wastewater opening 112 causes water 117 to flow through the wastewater opening 112 before reaching the outlet 108.

It is understood that any specific order or hierarchy of steps in any disclosed process is an example of an approach.

Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A method of operating a media clarifier during a cleaning cycle, said media clarifier comprising:
    a vessel defining an interior;
    a retention screen disposed within and spanning said interior, wherein said retention screen divides said interior into a first portion and a second portion, wherein at least a portion of said second portion is above said first portion along a vertical dimension of said media clarifier;
    an inlet for introducing water into said first portion of said interior;
    a water distribution header disposed in said first portion of said interior for receiving said water from said inlet;
    an outlet for conveying said water out of said vessel, wherein said retention screen is disposed downstream of said inlet and upstream of said outlet;
    a gas distribution header disposed in said first portion of said interior for introduction of gas into said first portion;
    a media bed disposed within said interior and downstream of said inlet, said media bed comprising both compressible media and incompressible media;
    a fluid control mechanism for controlling introduction of said water via said water distribution header into said first portion;
    a gas control mechanism for controlling said introduction of said gas via said gas distribution header into said first portion; and
    a fluid direction control mechanism for directing said water, downstream of said retention screen, either through said outlet or through a wastewater opening,
    wherein said method comprises:
        during a step of said cleaning cycle, operating said fluid control mechanism to introduce none of said water into said first portion, and operating said gas control mechanism to introduce none of said gas into said first portion;
        during an ensuing step of said cleaning cycle, operating said fluid control mechanism to introduce said water at a first water flow rate into said first portion, and operating said gas control mechanism to introduce said gas at a first gas flow rate into said first portion, said ensuing step being subsequent in time with respect to said step;
        during a following step of said cleaning cycle, operating said fluid control mechanism to introduce said water at a second water flow rate into said first portion, said second water flow rate being greater than said first water flow rate, and operating said gas control mechanism to introduce none of said gas into said first portion, said following step being subsequent in time with respect to said ensuing step;
        during a subsequent step of said cleaning cycle, operating said gas control mechanism to introduce said gas at a second gas flow rate into said first portion, said second gas flow rate being greater than said first gas flow rate, such that during at least a portion of said cleaning cycle, said incompressible media and said compressible media are stratified into discrete regions in that a layer of said incompressible media is disposed above a layer of said compressible media along said vertical dimension, said subsequent step being subsequent in time with respect to said following step.

2. The method of claim 1, wherein said compressible media is more flexible than said incompressible media.

3. The method of claim 2, wherein a size ratio of individual compressible media units in a dry state of said compressible media to individual incompressible media units in a dry state of said incompressible media is greater than 4 to 1.

4. The method of claim 1, wherein a specific gravity of said incompressible media is less than 1, and a specific gravity of said compressible media is 1 or greater.

5. The method of claim 4, wherein said specific gravity of said compressible media and said specific gravity of said incompressible media are different by at least 0.02.

6. The method of claim 5, wherein said specific gravities of said incompressible media and said compressible media are less than one.

7. The method of claim 6, wherein at least a portion of said incompressible media has at least one roughened surface.

8. The method of claim 7, wherein said gas control mechanism comprises a valve.

9. The method of claim 8, wherein during at least a portion of said cleaning cycle, a bulk density of a combination of said water and said gas injected into said water is less than a bulk density of at least a portion of said media bed.

10. The method of claim 9, wherein said media bed is at least six inches in depth along said vertical dimension when said media clarifier is in an operational state.

11. The method of claim 1, wherein said first gas flow rate is less than 1 standard cubic foot per minute per square foot of surface area (scfm/ft$^2$).

12. The method of claim 11, wherein said first water flow rate is 5 gallons per minute per square foot of surface area (gpm/ft$^2$).

13. The method of claim 12, wherein said second water flow rate is 12.5 gallons per minute per square foot of surface area (gpm/ft$^2$).

14. A method of operating a media clarifier during a cleaning cycle, said media clarifier comprising:
    a vessel defining an interior;
    a retention screen disposed within and spanning said interior, wherein said retention screen divides said interior into a first portion and a second portion, wherein at least a portion of said second portion is above said first portion along a vertical dimension of said media clarifier;
    an inlet for introducing water into said first portion of said interior;
    a water distribution header disposed in said first portion of said interior for receiving said water from said inlet;

an outlet for conveying said water out of said vessel, wherein said retention screen is disposed downstream of said inlet and upstream of said outlet;

a gas distribution header disposed in said first portion of said interior for introduction of gas into said first portion;

a media bed disposed within said interior and downstream of said inlet, said media bed comprising both compressible media and incompressible media;

a fluid control mechanism for controlling introduction of said water via said water distribution header into said first portion;

a gas control mechanism for controlling said introduction of said gas via said gas distribution header into said first portion; and a fluid direction control mechanism for directing said water, downstream of said retention screen, either through said outlet or through a wastewater opening, wherein said method comprises:

during a step of said cleaning cycle, operating said fluid control mechanism to introduce said water at a first water flow rate into said first portion, and operating said gas control mechanism to introduce said gas at a first gas flow rate into said first portion;

during a subsequent step of said cleaning cycle, operating said fluid control mechanism to introduce said water at a second water flow rate into said first portion, said second water flow rate being greater than said first water flow rate, and operating said gas control mechanism to introduce none of said gas into said first portion such that during at least a portion of said cleaning cycle, said incompressible media and said compressible media are stratified into discrete regions in that a layer of said incompressible media is disposed above a layer of said compressible media along said vertical dimension, said subsequent step being subsequent in time with respect to said step.

15. The method of claim 14, further comprising:

during a proceeding step of said cleaning cycle, operating said fluid control mechanism to introduce none of said water into said first portion, and operating said gas control mechanism to introduce none of said gas into said first portion, said proceeding step being prior in time with respect to said step.

16. The method of claim 15, wherein said first gas flow rate is less than 1 standard cubic foot per minute per square foot of surface area (scfm/ft$^2$).

17. The method of claim 16, wherein said first water flow rate is 5 gallons per minute per square foot of surface area (gpm/ft$^2$), and wherein said second water flow rate is 12.5 gallons per minute per square foot of surface area (gpm/ft$^2$).

18. The method of claim 17, wherein a specific gravity of said compressible media and a specific gravity of said incompressible media are different by at least 0.02.

19. A method of operating a media clarifier during a cleaning cycle, said media clarifier comprising:

a vessel defining an interior;

a retention screen disposed within and spanning said interior, wherein said retention screen divides said interior into a first portion and a second portion, wherein at least a portion of said second portion is above said first portion along a vertical dimension of said media clarifier;

an inlet for introducing water into said first portion of said interior;

a water distribution header disposed in said first portion of said interior for receiving said water from said inlet;

an outlet for conveying said water out of said vessel, wherein said retention screen is disposed downstream of said inlet and upstream of said outlet;

a gas distribution header disposed in said first portion of said interior for introduction of gas into said first portion;

a media bed disposed within said interior and downstream of said inlet, said media bed comprising both compressible media and incompressible media;

a fluid control mechanism for controlling introduction of said water via said water distribution header into said first portion; and a gas control mechanism for controlling said introduction of said gas via said gas distribution header into said first portion, wherein said method comprises:

during a step of said cleaning cycle, operating said fluid control mechanism to introduce said water at a first water flow rate into said first portion, and operating said gas control mechanism to introduce said gas at a first gas flow rate into said first portion;

during a subsequent step of said cleaning cycle, operating said fluid control mechanism to introduce said water at a second water flow rate into said first portion, said second water flow rate being greater than said first water flow rate, and operating said gas control mechanism to introduce none of said gas into said first portion such that during at least a portion of said cleaning cycle, said incompressible media and said compressible media are stratified into discrete regions along said vertical dimension, said subsequent step being subsequent in time with respect to said step.

20. The method of claim 19, further comprising:

during a proceeding step of said cleaning cycle, operating said fluid control mechanism to introduce none of said water into said first portion, and operating said gas control mechanism to introduce none of said gas into said first portion, said proceeding step being prior in time with respect to said step.

* * * * *